United States Patent
Baudou et al.

(10) Patent No.: US 8,487,233 B2
(45) Date of Patent: Jul. 16, 2013

(54) VISION EQUIPMENT COMPRISING AN OPTICAL STRIP WITH A CONTROLLED COEFFICIENT OF LIGHT TRANSMISSION

(75) Inventors: Joël Baudou, Saint Medard en Jalles (FR); Laurent Laluque, Bordeaux (FR); Jean-Michel François, Cadaujac (FR)

(73) Assignee: Thales, Neuilly-sur-Seine (FR)

( * ) Notice: Subject to any disclaimer, the term of this patent is extended or adjusted under 35 U.S.C. 154(b) by 304 days.

(21) Appl. No.: 12/898,611

(22) Filed: Oct. 5, 2010

(65) Prior Publication Data

US 2011/0240834 A1    Oct. 6, 2011

(30) Foreign Application Priority Data

Oct. 6, 2009   (FR) ...................................... 09 04769

(51) Int. Cl.
*G02B 27/01* (2006.01)
*G02F 1/03* (2006.01)
*G01J 1/42* (2006.01)

(52) U.S. Cl.
USPC ......................... 250/214 AL; 250/205; 345/8

(58) Field of Classification Search
USPC ................... 250/214 AL, 205; 345/7, 8, 9, 84
See application file for complete search history.

(56) References Cited

U.S. PATENT DOCUMENTS

| | | | |
|---|---|---|---|
| 3,961,181 A * | 6/1976 | Golden ....................... 250/208.2 |
| 5,305,012 A * | 4/1994 | Faris ................................. 345/7 |
| 5,623,730 A | 4/1997 | Baudou et al. |
| 5,742,937 A | 4/1998 | Baudou et al. |
| 6,342,872 B1 | 1/2002 | Potin et al. |
| 6,747,802 B2 | 6/2004 | Bignolles et al. |
| 6,879,932 B2 | 4/2005 | Baudou et al. |
| 7,199,767 B2 * | 4/2007 | Spero ................................. 345/7 |
| 7,893,890 B2 * | 2/2011 | Kelly et al. ........................ 345/8 |
| 7,914,154 B2 * | 3/2011 | Obi et al. ......................... 353/79 |
| 8,143,563 B2 * | 3/2012 | Broude et al. ............. 250/203.4 |
| 2003/0076649 A1 * | 4/2003 | Speakman ..................... 361/524 |
| 2003/0169213 A1 * | 9/2003 | Spero ................................. 345/7 |
| 2008/0094583 A1 * | 4/2008 | Williams et al. ................. 353/94 |
| 2008/0143639 A1 | 6/2008 | Gerbe et al. |

(Continued)

FOREIGN PATENT DOCUMENTS

| | | |
|---|---|---|
| EP | 1 158 336 A2 | 11/2001 |
| WO | 01/16640 A2 | 3/2001 |
| WO | 2008/109231 A2 | 9/2008 |

*Primary Examiner* — John Lee
(74) *Attorney, Agent, or Firm* — Baker & Hostetler LLP

(57) ABSTRACT

The invention relates to vision equipment including a translucent optical strip covering all or some of the visual field of the user of the said equipment and a device for projecting images onto the said strip in at least one zone of the visual field of the user, called the image-projection zone. The optical strip includes a plurality of zones covered by a layer of material with a controlled coefficient of light transmission, a zone at least covering the image-projection zone and in that the vision equipment also comprises a means for controlling the coefficient of light transmission capable of receiving status information and of controlling the coefficient of light transmission of each of the zones and independently of one another as a function of the said status information. The invention preferably applies to helmet visor equipment or head-up displays for an aircraft cockpit and to vision equipment in the motor vehicle field.

8 Claims, 3 Drawing Sheets

U.S. PATENT DOCUMENTS

| | | |
|---|---|---|
| 2008/0218434 A1* | 9/2008 | Kelly et al. .................. 345/8 |
| 2009/0058126 A1* | 3/2009 | Broude et al. ............ 296/97.2 |
| 2009/0091718 A1* | 4/2009 | Obi et al. .................. 355/30 |
| 2010/0265169 A1 | 10/2010 | Baudou |
| 2010/0283412 A1 | 11/2010 | Baudou |
| 2011/0188107 A1* | 8/2011 | Ward ...................... 359/242 |
| 2011/0213664 A1* | 9/2011 | Osterhout et al. ........ 705/14.58 |
| 2011/0240834 A1* | 10/2011 | Baudou et al. ......... 250/214 AL |

* cited by examiner

VISION EQUIPMENT COMPRISING AN OPTICAL STRIP WITH A CONTROLLED COEFFICIENT OF LIGHT TRANSMISSION

CROSS-REFERENCE TO RELATED APPLICATION

This application claims priority to foreign French patent application No. FR 0904769, filed on Oct. 6, 2009, the disclosure of which is incorporated by reference in its entirety.

FIELD OF THE INVENTION

The field of the invention relates to augmented reality vision equipment notably in the field of aviation for helmet visors.

BACKGROUND OF THE INVENTION

During a flight mission, an aircraft pilot has to monitor his flight environment while carrying out the tasks of piloting, navigation and completing his mission. The task of the pilot becomes particularly complex during flight phases at low altitude to monitor the obstacles and the terrain and, in the case of a tactical mission, to monitor moving objects. It is therefore normal to assist the pilot in the execution of his piloting functions with augmented reality systems. Specifically, there is, for example, vision equipment that, in real time, adds to the visual perception of the pilot with synthetic information. Head-up display equipment is known that makes it possible to superpose piloting and navigation information on the real images of the visual field of the pilot. These systems consist in placing, in the visual field of the pilot, a transparent and semi-reflective optical strip on to which images collimated to infinity are projected. This transparent optical strip can be a mirror mounted on the cockpit of an aircraft or, if necessary, the visor of the pilot's helmet.

The use of the vision equipment inside a cockpit is problematical for several reasons. First, this equipment is used during day and night missions. The result of this is therefore that the level of luminosity varies greatly and even regularly when the weather is cloudy. The visibility of the information shown in bright weather requires an image of strong luminosity and for that, in the case of helmet vision equipment, a solar visor is usually used for uniform transmission of approximately fifteen percent. There are also visors that can be interchanged with a higher transmission suitable for bad conditions of daytime visibility. However, when the pilot lowers his head to see the information on the instrument panel, he then has to lift the solar visor so as not to degrade the vision of the multifunctional screens. Similarly, during a tactical flight, the pilot has to look towards the bright sky, and then towards the ground where zones are in shade from the sun. He then has to manipulate his visor frequently and rapidly.

There are also vision systems coupled with thermal imaging cameras that superpose a video image on the image of the landscape. These systems make it possible to augment the vision of the terrain in the event of landing in bad visibility conditions due to fog, dust, etc. The visibility of this daytime image requires a strong contrast which the lowering of a solar visor does not process correctly because its presence also attenuates the residual visibility of the landscape.

To assist the pilot, night-vision systems integrated with a helmet visor with on-visor projection are also known. The night-time image is superposed on the landscape image seen through the visor. In such systems, the night-image lens is offset from the eyes in order to free up the view of the landscape. The result of this is a stereoscopic vision different from natural stereoscopic vision. At a short distance, this stereoscopic vision results in the night image not being superposed with the natural image resulting in a triple vision (real image, left night image and right night image or night image, right real image and left real image), the merging or convergence usually taking place on the brightest image. These triple images can disrupt the pilot notably when the scene comprises luminous points such as for example in an urban environment or on the landing runway. In these conditions, it is worthwhile to be able to mask the direct vision and give preference to night vision. One solution is for example the use of an additional partly opaque visor. The opaque portion of the additional visor is placed in front of the binocular image in order to augment its contrast and leave the lateral visual field free for retaining a good perception of the environment. This visor has to be removed rapidly for reasons of safety. However, this solution is not satisfactory for the same reasons mentioned above.

SUMMARY OF THE INVENTION

The invention alleviates the aforementioned problems by supplying a technical solution improving the quality of display of augmented reality vision equipment.

More precisely, the invention is an item of vision equipment comprising a translucent optical strip covering all or some of the visual field of the user of the said equipment and a device for projecting images onto the said strip in at least one zone of the visual field of the user, called the image-projection zone, characterized in that the optical strip comprises a plurality of zones covered by a layer of material with a controlled coefficient of light transmission, a zone at least covering the image-projection zone, and in that the vision equipment also comprises a means for controlling the coefficient of light transmission capable of receiving status information and of controlling the coefficient of light transmission of each of the zones and independently of one another as a function of the said status information.

According to a variant of the invention, it also comprises a device for detecting the posture of the user calculating status information relating to the direction of the gaze of the user so as to transit it to the control means in order to control the coefficient of light transmission of at least the projection zone as a function of the direction of gaze of the user.

According to a variant of the invention, it also comprises a manual control device calculating status information relating to levels of light transmission so as to transmit it to the control means in order to control the coefficient of light transmission of at least the projection zone according to a desired level.

According to a variant of the invention, it also comprises a photosensitive component determining status information relating to the luminosity level of the space around the optical strip so as to transmit it to the control means in order to control the coefficient of light transmission of at least the projection zone according to the luminosity level.

According to a variant of the invention, the material with a controlled coefficient of light transmission is of the electrochromic type and the control means comprises an electric circuit connected to at least one zone of the optical strip in order to control the coefficient of light transmission of the zone.

According to a variant of the invention, the material with controlled coefficient of light transmission is of the photochromic type, and the control means comprises a means for activating the photochromic reaction on at least one zone of the optical strip in order to control the coefficient of light transmission of the zone and according to one of these variants, the means for activating the photochromic reaction is a system for projecting ultraviolet rays.

Advantageously, the system for projecting ultraviolet rays comprises a plurality of ultraviolet-ray light-emitting diodes. Preferably, the system for projecting ultraviolet rays comprises optical control means for delimiting the projection zones of ultraviolet rays and for controlling the time of exposure to the ultraviolet rays of the said zones.

According to a variant of the invention, the material with controlled coefficient of light transmission is of the liquid crystal material type and the control means comprises an electric circuit connected to at least one zone of the optical strip in order to control the coefficient of light transmission of the zone.

In a preferred embodiment, the vision equipment is mounted on a helmet and the optical strip of the equipment is a visor of the said helmet.

The vision equipment according to the invention improves the quality of display of the images by an automatic management of the contrast depending on the conditions of use (ambient luminosity, orientation of the gaze of the user). Moreover, the independent control of the coefficient of light transmission of each field zone allows additional functionalities of the display surface. For example, the upper zone of the optical strip is used as a sun shade by controlling the coefficient of light transmission to a low level in the case of strong luminosity and the image-projection zone can be made virtually opaque in order to offer a view in the direct field zone only by thermal vision while leaving visibility on the outer peripheral zone. In the case of a helmet for an aircraft pilot, the vision equipment improves the ease of use and the safety of the flight by sparing the pilot the task of putting the solar visor in place and removing it. The helmet is also lightened by the weight of the solar visor which is then no longer of use.

BRIEF DESCRIPTION OF THE DRAWINGS

The invention will be better understood and other advantages will appear on reading the following description given as a non-limiting description, and by virtue of the appended figures amongst which.

DETAILED DESCRIPTION

The invention is vision equipment that makes it possible to superpose synthetic information on the real images perceived by the user and to automatically control the light transmission of several zones of the optical strip on which this information is displayed in order to improve the quality of display and ease of use of the equipment.

Figure 1:
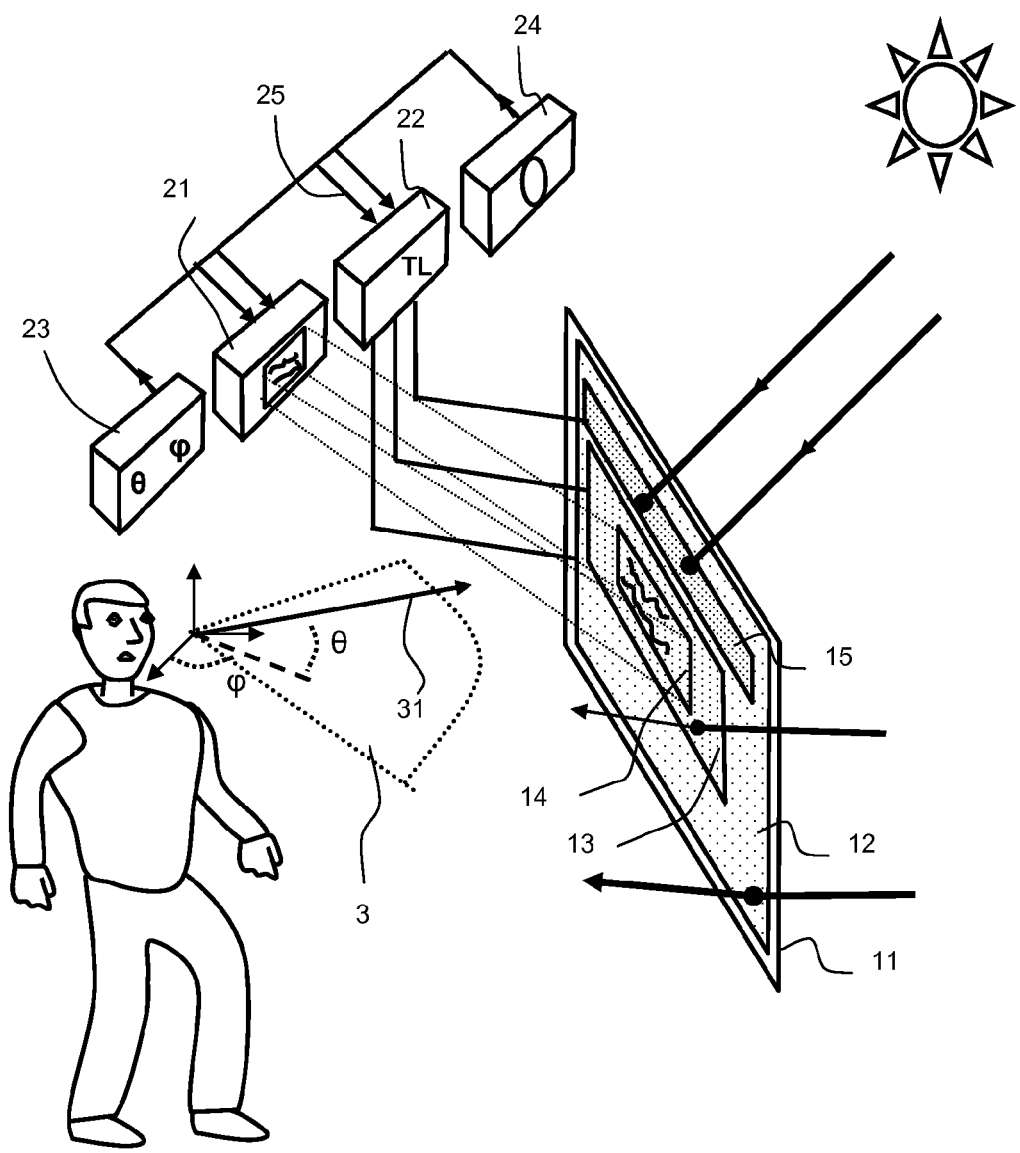
FIG. 1 illustrates the general principle of the augmented reality vision system according to the invention.

FIG. 1 represents generic vision equipment in order to illustrate the functions fulfilled by the invention. The vision equipment comprises an optical strip 11 situated in the visual field 3 of the user on which several field zones 12, 13 and 15 are delimited by the presence of a layer of material with variable transmission of light. According to an elementary embodiment, the optical strip comprises at least two field zones, a first zone 13 covering at least one information-projection zone 14 and a second zone 12 on the periphery of the first zone 13 preferably covering the visual field 3 of the user. The information displayed in the zone 14 originates from an image-projection device 21. In more enhanced embodiments, the optical strip has one or more additional field zones dedicated to additional functions of the vision equipment. For example, the field zone 15 covers the upper portion of the peripheral zone 12 in order to protect the user from the rays of the sun.

The zones 12, 13 and 15 of the optical strip 11 are covered with a layer of material with a variable coefficient of light transmission. It is possible to cite several material technologies that can be used: photochromic materials, electrochromic materials or also liquid crystal films. The coefficient of light transmission of each zone 12, 13 and 15 is controlled independently for each of the zones by a control means 22. Depending on the technology of the material with a coefficient of light transmission used, the way the control means is produced can vary. The control means 22 receives status information 25 and controls the coefficient of light transmission of each of the zones 12, 13 and 15. This status information is generated by one or more computing means 23 and 24.

The computing means 24 determines for example the level of luminosity of the environment of use of the vision equipment in order to adapt the contrast of the image-projection zone 14 depending on the ambient luminosity. In case of strong luminosity, the control means controls the field zone 15 so as to reduce the light transmission to the maximum in order to protect the user from the light rays. The peripheral field zone 12, in ordinary daylight conditions, is usually controlled to a high level of light transmission in order to allow the user to perceive the outside environment. However, in the event of strong luminosity, an attempt will be made to reduce the light transmission. The field zone 13 covering the image-projection zone is usually at a lower level of light transmission in order to improve the quality of display of the images that are to be superposed on the observed landscape. The levels of light transmission are adapted according to the application used on the optical strip 11. The levels sought vary depending on whether a synthetic information-projection application or a video-image projection application is used. The computing means 23 is capable of determining the angles $\phi$ and $\theta$ defining the direction of the gaze 31 of the user. This status information is useful for controlling the light transmission of the zones depending on the zone observed by the user.

Figure 2:
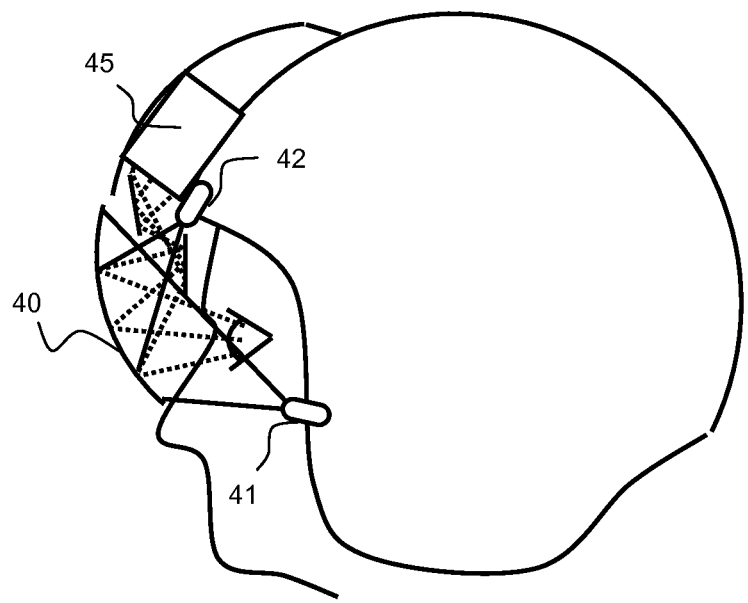
FIG. 2 represents a side view of a first embodiment of an item of helmet vision equipment with a photochromic material technology and a system for projecting ultraviolet rays.
Figure 3:
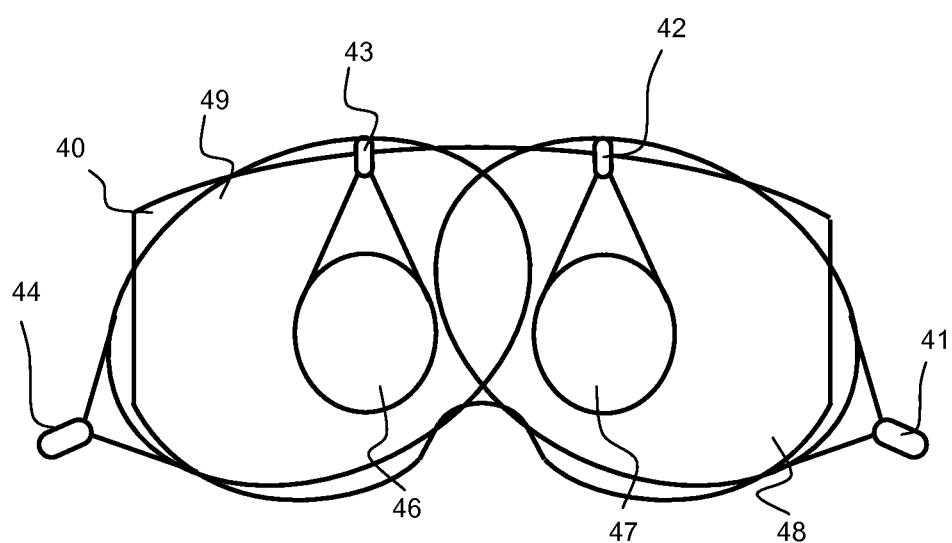
FIG. 3 represents the helmet visor for the embodiment with a photochromic-material technology and the ultraviolet-ray projection zones on the surface of the visor.

FIGS. 2 and 3 represent a first embodiment of the vision equipment for a visual of an aircraft pilot helmet. According to this embodiment, the visor 40 of the helmet of the pilot is used as a zone for projecting images generated by a collimation image-projection device 45 positioned on the top front portion of the shell of the helmet. The visor 40 usually comprises, on the inner surface, the surface on the side of the wearer of the helmet, a semi-reflective layer making it possible to make visible to the wearer the images projected onto the visor. The layer of variable-light-transmission material is a material of the photochromic type and is deposited onto a surface of the visor totally or partially covering the surface of the visor. If the helmet comprises two visors, the layer of photochromic material can be deposited on either one of the two visors. In this case, the optical strip comprising the layer of photochromic material is distinct from the optical strip onto which the image is projected.

A system of light-emitting diodes (LEDs) 41, 42, 43, 44 with ultraviolet (UV) rays is used as a means for controlling the coefficient of light transmission of the layer of photochromic material, or a coefficient of light transmission controller. The UV rays have properties causing the photochromic material to react and notably causing the level of light transmission of the layer of photochromic material to vary depending on the projected power of the UV rays. Therefore, the combination of the layer of photochromic material and of the system of LEDs with UV rays makes it possible to obtain a visor with controlled light transmission. The UV LEDs are placed on the helmet in several positions so as to project the UV rays onto several zones of the inner surface of the visor.

The layer of photochromic material is preferably deposited onto the inner surface of the visor 40 between the optical strip of the visor and the semi-reflective layer. In this way, the luminosity of the image is not attenuated by the layer of photochromic material. The semi-reflective layer used must then have capabilities for transmitting sufficient UV rays. It is also possible to deposit the layer of photochromic material onto the outer surface of the visor and also to place the light-emitting diodes on the outerside of the visor.

The UV LEDs can be multiples in order to make the transmission uniform and optical control means are preferably added in order to delimit the field zones on the visor for which the coefficient of light transmission is to be controlled. The LEDs are placed so as to illuminate the visor totally or partially and zones can be delimited by placing a lens and a diaphragm between the LED and the visor. In order to even out the transmission or the reaction of the photochromic material, a diffuser can be placed in front of the LED. The photochromic material that reacts to the UV rays absorbs the UV rays and only weakly reflects the UV radiation. A narrow-band filter can be placed in front of the UV LED in order to adapt it to the photochromic material so as to work only in the frequency band in which the photochromic material absorbs the most. The energy necessary for the reaction is low (less than 1 mW/cm$^2$), the radiation reflected to the face is therefore negligible and not dangerous. The UV LEDs are controlled by an activation switch and a level potentiometer.

FIG. 3 shows more precisely the delimitations of the field zones of the visor for which the light transmission is controlled. These zones are delimited by the UV-ray projection zones, optical means make it possible to improve the preciseness of the delimitations and to define the position of the said zones. The LEDs 42 and 43 cover two field zones 46 and 47 dedicated to the projection of images. The LEDs 41 and 44 also cover the two field zones. The level of light transmission of the zones 46 and 47 is therefore controlled by the total of the radiation energies of the UV rays originating from the four LEDs 41 to 44. For example, the image-projection zone 46 is covered by the projection of UV rays originating from the two LEDs 43 and 44. The LEDs 42 and 43 make it possible to distinguish the level of light transmission of the image-projection zones 46 and 47 of the peripheral field zones 48 and 49. The surface area of projection of the LEDs 41 and 44 is wider and totally or partially covers the visor 40. It is possible to delimit a plurality of light-transmission zones controlled by means of a system of several LEDs, UV-ray projection zones being capable of being combined or not.

The coefficient of light transmission of the photochromic material reacts depending on the energy radiated by the system of UV LEDs and consequently can be controlled linearly and continuously over the range of transmission of the material.

The use of a material of the photochromic type on the visor has the advantage of not having to install electrical connections between the visor and the control means dedicated to the control of the coefficient of light transmission of each field zone.

A material of the sol-gel type is deposited on the visor as part of this embodiment of the vision equipment. The type of photochromic material does not limit the extent of the invention. More generally, the invention applies to any type of material that reacts to a light excitation and to the control means that can generate this light excitation. Specifically, depending on the range of wavelength to which the photochromic cell deposited on the visor is sensitive, the means for activating the photochromic reaction, or a photochromic reaction activator, comprises means for generating light excitations in the chosen wavelength range.

Figure 4:
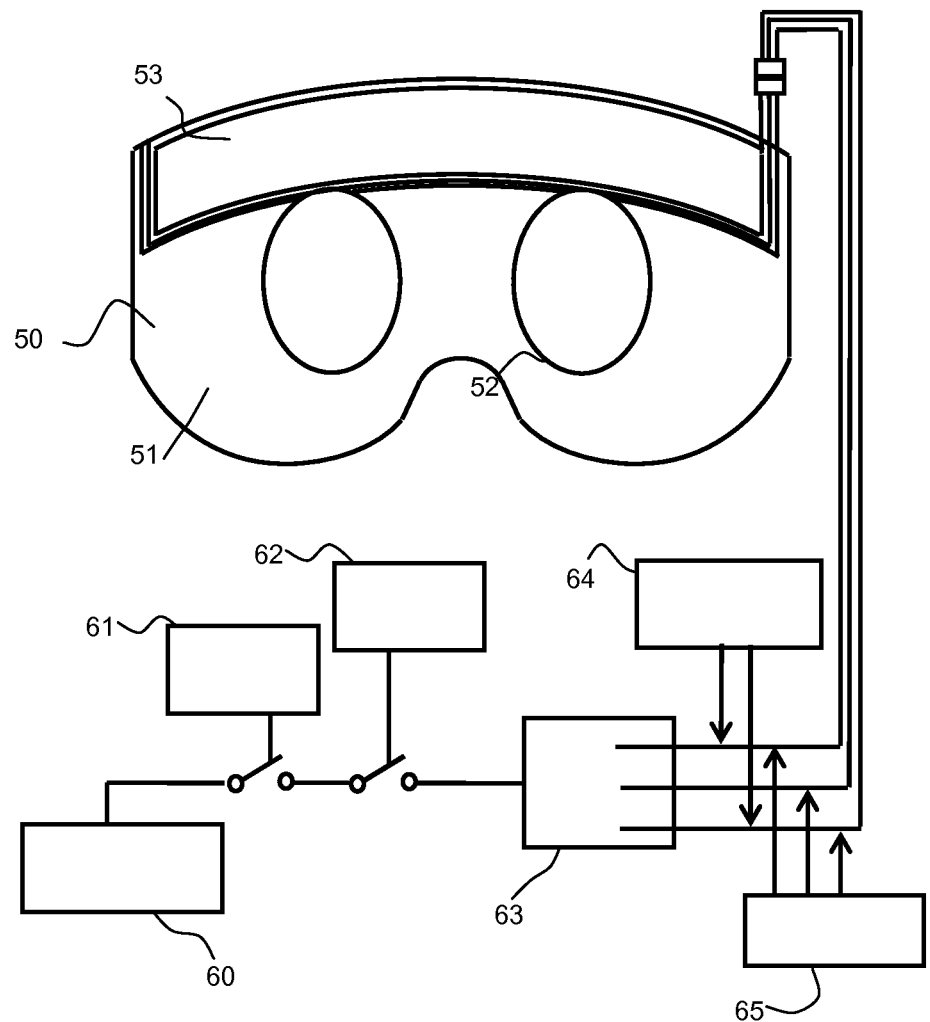
FIG. 4 represents a second embodiment of an item of helmet vision equipment with an electrochromic-material technology.

FIG. 4 represents a second embodiment for an item of vision equipment for a helmet of an aircraft pilot. According to this embodiment, the visor 50 of the helmet of the pilot is used as a zone for the projection of images generated by a collimation image-projection device positioned on the upper front portion of the shell of the helmet. The visor 50 usually comprises on the inner surface, the surface on the side of the wearer of the helmet, a semi-reflective layer making it possible to make the images projected onto the visor visible to the wearer. The electrochromic material is deposited onto the surface of the visor behind the semi-reflective layer with respect to the user. An electrochromic material has properties making it possible to control its coefficient of light transmission by the application of an electric charge to the material.

The image-projection zones are defined by the field zones 52 centred on the visor and are covered with the electrochromic material. The field zone 51 is peripheral to the field zones 52 and also covered with the electrochromic material. The visor 50 also comprises a field zone 53 which is on the upper portion of the peripheral zone 51 dedicated to protection from the solar rays making it possible to prevent the wearer from being dazzled. The coefficient of light transmission of each of the zones 51, 52 and 53 is controlled by an electric current and the electric charge applied to a zone can be controlled independently of the other zones. For this, the visor comprises a circuit of electric connections each connecting field zones of the visor to a control means 63. The field zones of the visor are delimited by the network of electric connections. This control means 63 is capable of computing electric voltage levels as a function of status information such as the level of luminosity, the position of the user, the type of image displayed, etc.

The coefficient of light transmission varies depending on the potential difference applied to the material and can therefore be controlled linearly and continuously over a given transmission range depending on the material used. For certain materials, the transmission range is between 5% and 70% in the visible domain. For example, the following table illustrates a law for controlling the transmission coefficients of the zones 51, 52 and 53 depending on the situations of luminosity and on the type of images displayed. The control law can also be applied with the visor with photochromic material and the UV-ray control means.

The level of electric voltage applied to each zone 51, 52 and 53 can also be controlled by potentiometers 65 and photoresistance sensors 64. For example, the coefficient of light transmission of the zones 51 and 53 varies automatically depending on the ambient luminosity. The control means can be slaved to a posture-detection device 62 and can be activated by a main switch 61. The control means 63 is powered by the power-supply device 60 of the helmet visor.

| Selected display mode | Transmission zone 53 | Transmission zone 52 | Transmission zone 51 |
|---|---|---|---|
| Daylight video | 70% | 15% | 100% |
| Night-time video | 100% | 100% | 100% |
| Night-time video | 100% | 100% | 100% |
| Night-time video urban environment | 100% | 15% or 0% | 100% |
| Daylight symbology + solar visor | 15% | 25% | 25% |
| Daylight symbology, clouds | 25% | 75% | 75% |

According to any one of the embodiments as described above, the vision equipment of the helmet is connected to a system of image-acquisition by thermal-imaging camera in order to superpose a video image onto the real images. Control of the coefficient of light transmission of the image-projection zone independently of the peripheral field zone makes it possible to mask the real scene only in the image-projection zone and to leave the peripheral field zone visible. Thus, the pilot is not disrupted by a triple vision and retains visibility of the outside landscape.

According to any one of the embodiments as described above, the image-projection device is connected to a device for detecting the posture of the pilot. A posture-detection device computes status information making it possible to determine the orientation of the pilot's gaze. In an enhanced embodiment of the vision equipment, the means for controlling light transmission is connected to the device for detecting the posture of the pilot in order to be able to adapt the light transmission of the visor depending on whether the pilot is directing his gaze to the landscape or to the instrument panel, for example. Thus, when the masking of the real scene or the solar protection mode are activated, they will be automatically deactivated when the pilot looks in the direction of the instrument panel or at the inside of the cockpit. The control means is also connected to a luminosity sensor making it possible to automatically adapt the light transmission of the field zones of the visor.

The surface area of the helmet visors usually comprises at least two zones with a different radius of curvature corresponding to the zones seen by each eye of the pilot. The material with variable coefficient of light transmission covers at least the said zones with distinct curvature. The visor also consists of an organic material of the plastic type.

Another embodiment of the vision equipment can also be a visor onto which a liquid-crystal film is deposited in order to control the coefficient of light transmission of the visor. The associated control means are also mounted on the helmet.

The vision equipment is particularly intended for aircraft-pilot helmets comprising a helmet aiming device. More generally, the vision equipment according to the invention can be applied to head-up displays but also to the motor vehicle field for electronic driving-aid equipment.

The invention claimed is:

1. Vision equipment, comprising:
a translucent optical strip covering all or some of a visual field of a user of the equipment; and
a device for projecting images onto the strip in at least one zone of the visual field of the user, called an image-projection zone, wherein
the optical strip comprises a plurality of zones covered by a layer of photochromic material with a variable coefficient of light transmission, one of the plurality of zones covering at least the image-projection zone,
the vision equipment further comprises a variable coefficient of light transmission controller including a photochromic reaction activator that activates at least one of the plurality of zones of the optical strip in order to control the variable coefficient of light transmission of a zone configured to receive status information and to control the variable coefficient of light transmission of each of the plurality of zones independently of one another as a function of the status information, and
the photochromic reaction activator includes a plurality of ultra-violet light-emitting diodes arranged to control the variable coefficient of light transmission of the plurality of zones simultaneously and independently.

2. The vision equipment according to claim 1, further comprising a device for detecting a posture of the user by calculating status information relating to a direction of a gaze of the user so as to transmit the status information relating to the direction of the gaze of the user to the variable coefficient of light transmission controller in order to control the variable coefficient of light transmission of at least the image-projection zone as a function of the direction of the gaze of the user.

3. The vision equipment according to claim 1, further comprising a manual control device calculating status information relating to levels of light transmission so as to transmit the status information relating to levels of light transmission to the variable coefficient of light transmission controller in order to control the variable coefficient of light transmission of at least the image-projection zone according to a desired level.

4. The vision equipment according to claim 1, further comprising a photosensitive component determining status information relating to a luminosity level of a space around the optical strip so as to transmit the status information relating to the luminosity level to the variable coefficient of light transmission controller in order to control the variable coefficient of light transmission of at least the image-projection zone according to the luminosity level.

5. The vision equipment according to claim 1, further comprising optical control means for delimiting projection zones of ultraviolet rays and for controlling a time of exposure to the ultraviolet rays of the at least one zone of the visual field of the user.

6. The vision equipment according to claim 1, being mounted on a helmet, wherein the optical strip of the equipment is a visor of the helmet.

7. The vision equipment according to claim 1, wherein the plurality of ultra-violet light-emitting diodes includes a first ultra-violet light-emitting diode and a second ultra-violet light-emitting diode, such that
the first ultra-violet light-emitting diode irradiates a first zone of the visual field of the user, and
the second ultra-violet light-emitting diode irradiates a second zone of the visual field of the user.

8. The vision equipment according to claim 7, wherein the plurality of ultra-violet light-emitting diodes includes a third ultra-violet light-emitting diode and a fourth ultra-violet light-emitting diode, such that
the third ultra-violet light-emitting diode irradiates a first portion of the image-projection zone disposed within the first zone of the visual field of the user, and the fourth ultra-violet light-emitting diode irradiates a second portion of the image-projection zone disposed within the second zone of the visual field of the user.

* * * * *